June 5, 1951 — W. F. HELMOND — 2,555,645
PAPER FEEDING MEANS FOR TYPEWRITING AND LIKE MACHINES
Filed Dec. 24, 1948
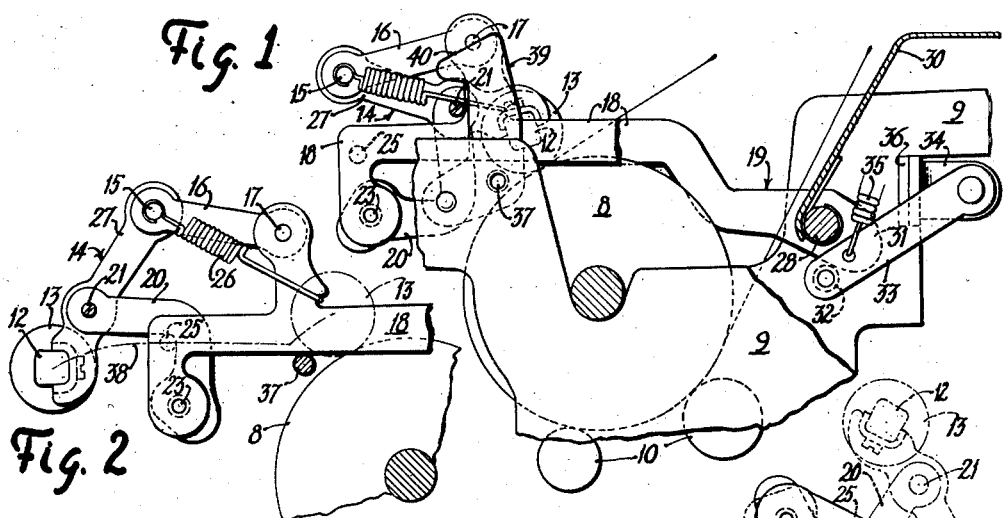
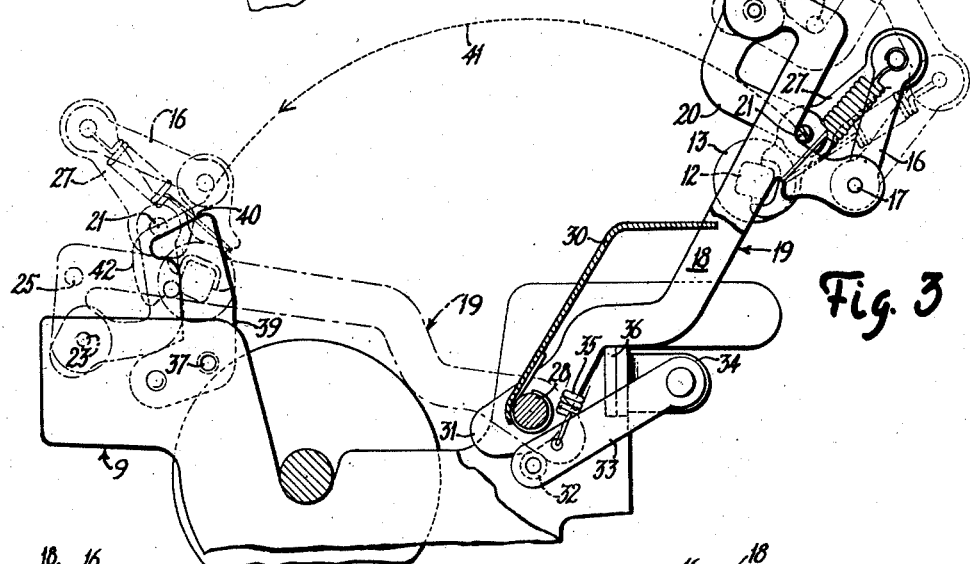
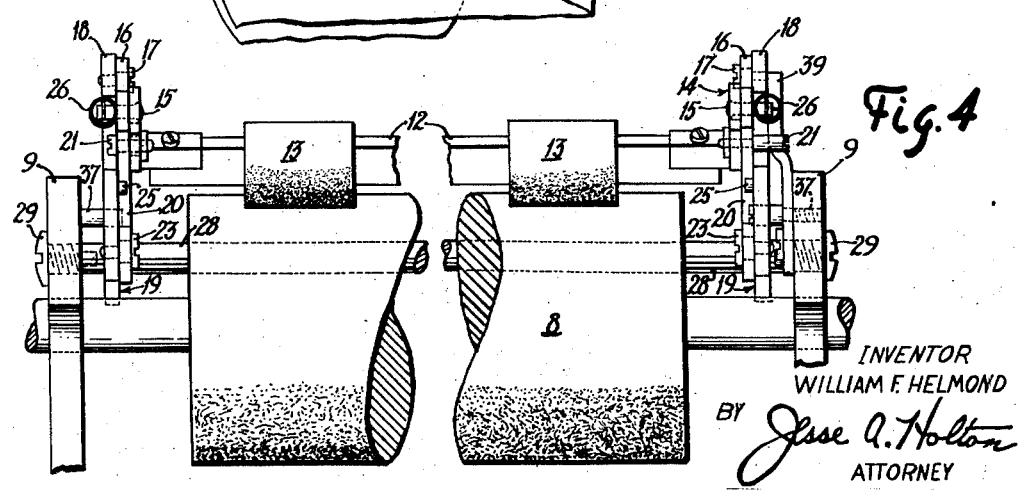
INVENTOR
WILLIAM F. HELMOND
BY Jesse A. Holton
ATTORNEY Patented June 5, 1951

2,555,645

UNITED STATES PATENT OFFICE 2,555,645

PAPER FEEDING MEANS FOR TYPEWRITING AND LIKE MACHINES

William F. Helmond, Clinton, Conn., assignor to Underwood Corporation, New York, N. Y., a corporation of Delaware Application December 24, 1948, Serial No. 67,105

3 Claims. (Cl. 197—138)

This invention relates to paper-feeding means for typewriters and like machines, and particularly to auxiliary paper-feed bails at the front of the platen roll.

In one aspect the invention is in the nature of an improvement over the bail structure of the Helmond Patent No. 2,327,423, an object of the invention being to enable movement of said bail structure entirely from in front of the platen to an out-of-the-way position upwardly and rearwardly therefrom, without losing any of the operating advantages of said structure.

Bail structures in general providing for movement to such out-of-the-way position are well known in the art, as shown for example in Hess Patent No. 1,516,532, and Helmond Patents Nos. 1,916,371 and 2,142,245. However, the bail mechanism of the later Helmond Patent No. 2,327,423, although not arranged for displacement rearwardly of the platen in the embodiments shown, provides certain operating advantages such as that of a compact mechanism which nevertheless affords a wide opening between the platen and feed rolls when the bail is forwardly extended, affording also carefree manipulation of the bail mechanism in moving the feed rolls to and from the platen, and in restoring the bail, to have the feed rolls engage the platen tangentially and then ride up same an appreciable extent to thereby eliminate any tendency of the paper to bulge at the typing line.

In its upward and rearward position, the linkage of the bail mechanism may be either in its extended or its folded condition, when the bail structure is to be returned for use at the front of the platen. Another object resides in providing means cooperative with the bail linkage in its folded condition to automatically, and at least partially, unfold said linkage as the bail mechanism approaches the front of the platen, to the end that the front feed rolls will be guided away from the platen to an extent such as will enable the feed rolls to thereafter move to and ride up the platen.

With the above and other objects in view, the invention will now be described with reference to the accompanying drawings wherein a preferred embodiment of the invention is shown for the purposes of illustration.

In the drawings:

Figure 1 is an end elevation, partly broken away, of a portion of a typewriter embodying the invention, the feed roll supporting bail being in its normal or effective position, Figure 2 is a fragmentary view similar to Figure 1 but showing the feed roll supporting bail in its forwardly extended position, Figure 3 is a view similar to Figure 1 but shows the entire bail structure swung to the rearward, out-of-the-way position and also demonstrates the action of the bail mechanism in being restored for use at the front of the platen, and Figure 4 is a front elevational view of the bail mechanism in the position shown in Figure 1.

The usual cylindrical platen 8 is mounted for rotation on end members 9 of the platen carriage and cooperates with the usual bottom feed rolls 10 to feed a work sheet to successive typing lines. As afore indicated, a portion of the combined overhead bail mechanism embodying the present invention is substantially as shown and described in Helmond Patent No. 2,327,423. A brief description of that portion of the mechanism, which now follows, will therefore suffice to illustrate the cooperation with and the advantages of the present improvements.

A bail rod indicated at 12 rotatably carries feed rolls 13 which may be mounted thereon as described in Helmond Patent No. 2,163,944. At each end of the bail rod 12 is rigidly secured a lever arm 14, each arm having at one end a channel-shaped lug to which the square bail rod is secured. The other end of each lever arm 14 provides a pivot 15 by which said arm is articulated to a link 16 pivotally mounted at 17 on an end arm 18 of a supporting bail-like frame 19 later described. An angle link 20 is connected to each lever arm 14, intermediate the bail rod 12 and pivot 15, by a pivot pin 21, and these angle links are pivotally mounted on the arms 18 of bail frame 19 by studs 23 secured to each arm and extending through apertures in the links 20. When the bail rod 12 is brought to extended position away from the plates, as shown in Figure 2, the angle links 20 come to rest against stop pins 25 at the forward ends of bail arms 18. A spring 26 is provided at each end of the bail 14—12—14, these springs being secured at their forward ends to the pivot studs 15, their rearward ends being anchored on the arms 18. The point of anchorage of each spring 26 is located substantially as shown so that the spring tension constantly tends to turn link 16 counterclockwise about its pivot 17 in all positions of the bail-carrying linkage at or between the extended and folded conditions of said linkage.

The bail rod 12 and its end arms 14 constitute a rigid bail. In rocking this bail to and from the platen, the bail rod functions as a torsional or equalizing member of the bail mechanism, causing each of the arms 14 and the associated links to move correspondingly, with the result that the bail rod 12 is maintained in constant parallelism with the platen axis.

The bail mechanism at each end presents a three-arm linkage comprising the link 16, a portion 27 of lever arm 14, and the link 20, the arm portion 27 forming an intermediate or connecting member of said linkage. The coaction of the linkage elements, however, may be more readily understood by considering the mechanism as including first the two-arm linkage 16, 27, and secondly, the two-arm linkage 27, 20, both linkages having the member 27 as a common element.

When manual pressure is applied to the bail rod 12 in its extended position, Figure 2, the two-arm linkage 16, 27 is being folded, during which pivot 15 is moved in a clockwise direction about the stud 17 against the force of spring 26. The manual effort on the bail rod is continued until the linkage assumes a medial or dead-center position, in which the second linkage 27, 20 is in a straight condition, that is, with the pivot 21 on a straight line with the axis of pivot 15 and stud 23. When the linkage is moved just beyond this dead-center position, the force of spring 26 on the linkage mechanism tends to fold linkage 27, 20 and thus urges the bail rod 12 toward the platen without further manual effort. To move the bail rod 12 from normal to extended positions, or vice versa, manual effort need be applied only to carry the mechanism just beyond the dead-center position, after which the spring 26 will actuate the mechanism to carry the bail rod to the desired position. The spring 26 and the links 16 and 20, in the cooperative relation shown, thus constitute an overthrow device by which the bail 14—12—14 is urged in either a forward or rearward direction from the medial position.

In the extended position, Figure 2, the linkage 16, 27 approaches a straight condition and the spring 26 tends to further straighten this linkage, thus holding the bail at the extended position determined by the angle link 20 engaging the stop pin 25. In moving to the normal position, Figure 1, the linkage 16, 27 is being folded and the spring 26, through the coaction of link 20 with said linkage, brings the bail rod 12 in a substantially straight path toward the platen, approaching the platen in a direction generally tangential to its periphery. The pivot pin 21 extends outwardly from the linkage for cooperation with an upright edge of arm 18, as shown in Figures 1 and 4, which largely determines the normal position of the bail rod with the feed rolls 13 engaging the platen. The front bail mechanism just described is substantially like that of my prior Patent No. 2,327,423.

By the means now to be described, including the mentioned supporting frame 19, the bail 14—12—14 and its mounting linkage is capable of being bodily moved to an upwardly and rearwardly displaced position, as shown in Figure 3. At their rear ends the frame arms 18 are rigidly fixed to a shaft 28 forming a part of the frame 19. Shaft 28 is rotatably mounted by pivot screws 29, Figure 4, threaded in the end walls 9 of the carriage. A paper shelf 30 may be loosely held to shaft 28 to allow forward displacement of same for the usual purposes. Near their juncture with shaft 28 the frame arms 18 are each extended to provide a detent cam 31 shaped substantially as shown so as to be eccentric to the axis of said shaft. Said cam, in cooperation with a spring-pressed follower roller 32, yieldably holds the bail-like frame 19 in either the Figure 1 or Figure 3 position. Each of the rollers 32 is rotatably carried on a detent arm 33 pivotally supported on a bracket 34 secured to one of the carriage end members 9. A spring 35 for each arm 33 tends to rock said arm clockwise and thus press the follower roller 32 into coaction with the cam end 31 of each arm 18. In the upward and rearward position, Figure 3, the side arms 18 of the frame 19 each rest against a lug 36 on each carriage end member. As the frame 19 is swung forwardly from the Figure 3 position, the cam 31 urges the roller 32 outwardly until said frame is moved past a medial position, after which the spring-urged roller 32 tends to swing the frame 19 downward until the arms 18 thereof engage stop pins 37 on the carriage end members 9.

If the supporting linkage of bail 14—12—14 is extended, with the frame 19 in its raised, rearward position, as shown in phantom in Figure 3, the lowering of said frame to the forward position will of course lower the front bail mechanism so that it assumes the position shown in Figure 2. It may be presumed that a work sheet has just been placed around the platen and that the typist is holding the leading portion of the sheet loosely against the platen. Upon lowering the bail structure to the Figure 2 position, the typist need only urge the bail rod 12 rearwardly past the dead-center position of the linkage 16, 27, 20. This will allow the spring 26 to have its overthrow action on the bail 14—12—14, after which the bail rod 12 will continue to move toward the platen under tension of spring 26 until the feed rolls 13 engage the work sheet, at which time of course the typist may release the sheet. In Figure 2, the dot-and-dash line 38 traces the path of the axis of the feed rolls 13 in approaching the platen and engaging the work sheet. It will be seen from this that the feed rolls 13 move in a substantially straight-line path tangential with the platen 8 until they engage the work sheet on the platen, after which the path is concentric with the platen axis as the feed rolls 13 ride up the platen to the position shown in outline in Figure 2. During this final movement the feed rolls tend to eliminate any bulging of the paper at the typing line. When the feed rolls 13 assume their final position as described, the bail linkage 16, 27, 20 assumes the folded condition shown in Figure 1, with the pivot pin 21 thereof engaging the upright edge of arm 18. When the feed rolls begin to take the path concentric with the platen, the pin 21 is of course well away from said upright edge, at a distance shown by the extent of the concentric path. This path deviates somewhat from the end portion of the path defined by the bail linkage 16, 27, 20, which deviation tends to lift the bail and linkage bodily as the feed rolls ride up the platen, and results in a partial upward swing of the bail frame 19 off the stop pins 37, as shown in Figure 1. The pivotal rise of frame 19 is also of advantage in accommodating a large number of work sheets, by allowing the feed rolls 13 to move upward substantially radially of the platen under the tension of the detent 31, 32, as required by the thickness of the manifold work.

In the upward and rearward position of frame 19, the bail linkage 16, 27, 20 may be in its folded condition, as shown in full lines in Figure 3. It will be seen that with the work sheet in position around the platen, with its leading portion held by the typist against the platen, if the bail structure were to be lowered to the forward position with the linkage thus folded, the feed rolls would engage the work sheet downwardly and thus tend to bulge the sheet at the typing line. To obviate this, the present invention provides means cooperative with the bail linkage 16, 27, 29 in its folded condition to automatically, and at least partially, unfold said linkage as the bail mechanism approaches the front of the platen. Accordingly an upstanding member 39 is secured to the carriage end member 9 and has at its upper edge an inclined cam 40 disposed to be engaged by the pivot pin 21 with said linkage folded. The path of said pin, during the forward swinging of frame 19, is indicated by the dotted line 41, the arcuate portion of said path being concentric with the axis of shaft 28. However, as the frame 19 approaches the forward and downward position, the pin 21 comes into engagement with the cam 40, causing said pin to move forwardly from the arcuate path as it rides down the inclined face of the cam. In the embodiment shown, the length of said cam face is such that the action thereof on pin 21 causes the bail linkage 16, 27, 29 to be partially unfolded without said linkage, however, moving beyond the medial or dead-center condition previously described. For this reason the tension of spring 26 still tends to fold the bail linkage. Therefore, as the pin 21 rides off the lower end of cam 40, it allows spring 26 to refold the linkage from its then partially unfolded condition. The path of said pin during this camming and refolding action is indicated at the dotted line 42. Considering this action, now, as applied to the feed rolls 13, it will be seen that the partial unfolding of the bail linkage will bring the feed rolls forward and clear of the work sheet being held by the typist. That is, the feed rolls will be brought to a downward position clear of the work sheet as the frame 19 comes to rest against the pin 37, after which the refolding action of spring 26 will cause the feed rolls to approach the platen partly along the path indicated by line 38, in Figure 2. Thus, as the bail linkage concludes its refolding action, the feed rolls 13 will ride up the platen in the path defined by the portion of line 38 concentric with the axis of platen 8. In this way any tendency of the work sheet to bulge at the typing line will be eliminated, due to the wiping action of the feed rolls in riding up the platen.

What is claimed is:

1. In a typewriting machine having a platen and a carriage, in combination, a frame swingable on the carriage on an axis rearward of the platen, a paper-guiding bail carried on said frame and normally disposed at the platen with said frame in a downward position, means mounting said bail on the frame for rocking movement of the bail to and from the platen, including an overthrow device to urge the bail from a medial position of rocking movement in either a forward or rearward direction, said frame affording displacement of said bail and its mounting means bodily to a position rearward of the platen, and a device cooperative with the bail in its rearwardly rocked position on the frame to automatically rock said bail at least partially toward its forward position on the frame incident to restoring the frame to its downward position.

2. In a typewriting machine having a platen and a carriage, in combination, a bail-like frame swingable on the carriage on an axis rearward of the platen, a paper-guiding bail at the front of the platen, means mounting said bail on said frame for movement of the bail between an in-use position at the platen for guiding the paper and a position forwardly away from the platen, spring means acting on said bail and mounting means to urge said bail from a medial position to either of said positions, said frame affording displacement of said bail and its mounting means bodily to a position upward and rearward of the platen, and cam means cooperative with said bail in its in-use position on the frame as said frame is swung downwardly, to move said bail toward its medial position, whereby the bail is brought clear of the platen, said cam means being adapted to release said bail as said frame concludes its downward swing, to enable said spring means to restore the bail to its in-use position.

3. In a typewriting machine having a platen and a carriage, in combination, a bail-like frame swingable on the carriage on an axis rearward of the platen, a paper-guiding bail including end arms, linkage mechanism mounting said bail on said frame for movement of the bail between an in-use position at the platen and an out-of-use position away from the platen, said mechanism including two links at each end of the bail pivoted to the bail end arms at spaced points and swingably mounted at spaced points on said frame, a spring acting on one of said links to tend to urge said bail, thru the coaction of said links, from a medial position to either the in-use or the out-of-use position, a pin at the pivotal point of one of said links to the bail end arm, said frame affording displacement of said bail and its mounting linkage bodily to a position upward and rearward of the platen, and a cam on the carriage adapted to be engaged by said pivot pin upon swinging said frame downwardly with the bail in its in-use position on the frame to move said bail toward its medial position in which the bail is clear of the platen, said cam being of such length as to release said pin before the frame reaches its lowermost position, to thereby allow said spring to restore the bail to its in-use position.

WILLIAM F. HELMOND.

REFERENCES CITED

The following references are of record in the file of this patent:

UNITED STATES PATENTS

| Number | Name | Date |
|---|---|---|
| 1,516,532 | Hess | Nov. 25, 1924 |
| 2,142,245 | Helmond | Jan. 3, 1939 |
| 2,327,423 | Helmond | Aug. 24, 1943 |